(12) United States Patent
Wan et al.

(10) Patent No.: US 7,448,052 B2
(45) Date of Patent: Nov. 4, 2008

(54) PROTECTION DEVICE FOR OPTICAL RECORDING/REPRODUCING APPARATUS

(75) Inventors: Li-Ming Wan, Shenzhen (CN); Bin-Hai Guo, Shenzhen (CN)

(73) Assignees: Hong Fu Jin Precision Industry (Shenzhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 600 days.

(21) Appl. No.: 11/022,264

(22) Filed: Dec. 23, 2004

(65) Prior Publication Data

US 2005/0289578 A1    Dec. 29, 2005

(30) Foreign Application Priority Data

Jun. 25, 2004    (CN)    .................. 2004 2 0071122

(51) Int. Cl.
*G11B 33/14*    (2006.01)
(52) U.S. Cl. ....................................................... 720/648
(58) Field of Classification Search ................ 720/648, 720/601, 602, 603, 646; 360/97.01; 369/75.11, 369/75.21; 361/685
See application file for complete search history.

(56) References Cited

U.S. PATENT DOCUMENTS

| 6,005,768 | A   | * | 12/1999 | Jo ............................... | 361/685 |
| 6,061,204 | A   |   | 5/2000  | Tong ....................... | 360/97.04 |
| 6,094,323 | A   |   | 7/2000  | Tong ....................... | 360/97.02 |
| 6,782,543 | B2  | * | 8/2004  | Ahn ........................... | 720/601 |
| 6,891,721 | B2  | * | 5/2005  | Huang ....................... | 361/685 |
| 6,971,111 | B2  | * | 11/2005 | Chuang et al. .............. | 720/601 |
| 2004/0172641 | A1 | * | 9/2004 | Saito ........................... | 720/646 |

FOREIGN PATENT DOCUMENTS

| CN | 02241631.5 |   | 6/2003 |
| CN | 02130273.1 |   | 2/2004 |
| JP | 09035394 A | * | 2/1997 |

\* cited by examiner

*Primary Examiner*—Tianjie Chen
(74) *Attorney, Agent, or Firm*—Morris, Manning & Martin LLP; Tim Tingkang Xia

(57) ABSTRACT

A protection device for the optical recording/reproducing apparatus includes at least one cover, a front panel fixed to the cover at a front opening, and at least one blocking strip extending down from a front of the cover. A clasping portion defining a first clasping hole extends from a front of the cover. A first latch engageable in the first clasping hole is formed on the front panel. The blocking strip prevents debris of an optical disk from flying out and causing damage to the optical recording/reproducing apparatus.

17 Claims, 5 Drawing Sheets

PROTECTION DEVICE FOR OPTICAL RECORDING/REPRODUCING APPARATUS

BACKGROUND OF THE INVENTION

1. Field of the Invention

The present invention relates to protection devices for optical recording/reproducing apparatuses, and more particularly to a protection device for sealing an optical recording/reproducing apparatus and preventing damage being caused by a disk that breaks inside the optical recording/reproducing apparatus.

2. Description of the Related Art

An optical recording/reproducing apparatus has become a standard feature of a personal computer system, for recording information and/or playing music and/or video recordings. A typical optical recording/reproducing apparatus can be used with media such as CD-ROMs (Compact Disk Read Only Memories), CD-RWs (Compact Disk Rewritables), and DVD-ROMs (Digital Versatile Disk Read Only Memories).

The fast development of information technology has helped to greatly advance the technology of optical recording/reproducing apparatuses. One important development has been the significant increase in the speed at which an optical disk in an optical recording/reproducing apparatus rotates.

A conventional protection device for an optical recording/reproducing apparatus is disclosed in China Patent No. 02241631. The protection device comprises a plurality of blocking strips for preventing debris of a broken optical disk from flying out, and a plurality of protruding strips. The blocking strips and the protruding strips respectively extend downwardly and forwardly in an interlacing pattern from a front edge of a top cover of the optical recording/reproducing apparatus. The protruding strips are inserted into and engaged in a slot defined at a back of a front panel of the optical recording/reproducing apparatus. Large disk debris can be completely blocked by two or more adjacent blocking strips. However, small debris cannot be completely blocked by the blocking strips. The small debris may still fly out via a gap between two adjacent blocking strips and impact the front panel, and may even disturb the attachment of the front panel to the top cover.

SUMMARY OF THE INVENTION

Accordingly, an object of the present invention is to provide a simple and reliable protection device for an optical recording/reproducing apparatus.

In order to achieve the object set out above, a protection device for an optical recording/reproducing apparatus of the present invention comprises: at least one cover comprising a clasping portion extending from a front thereof, the clasping portion defining a first clasping hole, and the cover defining a front opening; a front panel fixed to the cover at the front opening, the front panel comprising a first latch, the first latch being engageable in the first clasping hole; and at least one blocking strip extending down from a front of the cover, for preventing debris of an optical disk from flying out and causing damage to the optical recording/reproducing apparatus.

BRIEF DESCRIPTION OF THE DRAWINGS

Other objects, advantages and novel features of the present invention will become more apparent from the following detailed description when taken in conjunction with the accompanying drawings, in which.

DETAILED DESCRIPTION OF THE INVENTION

Figure 1:
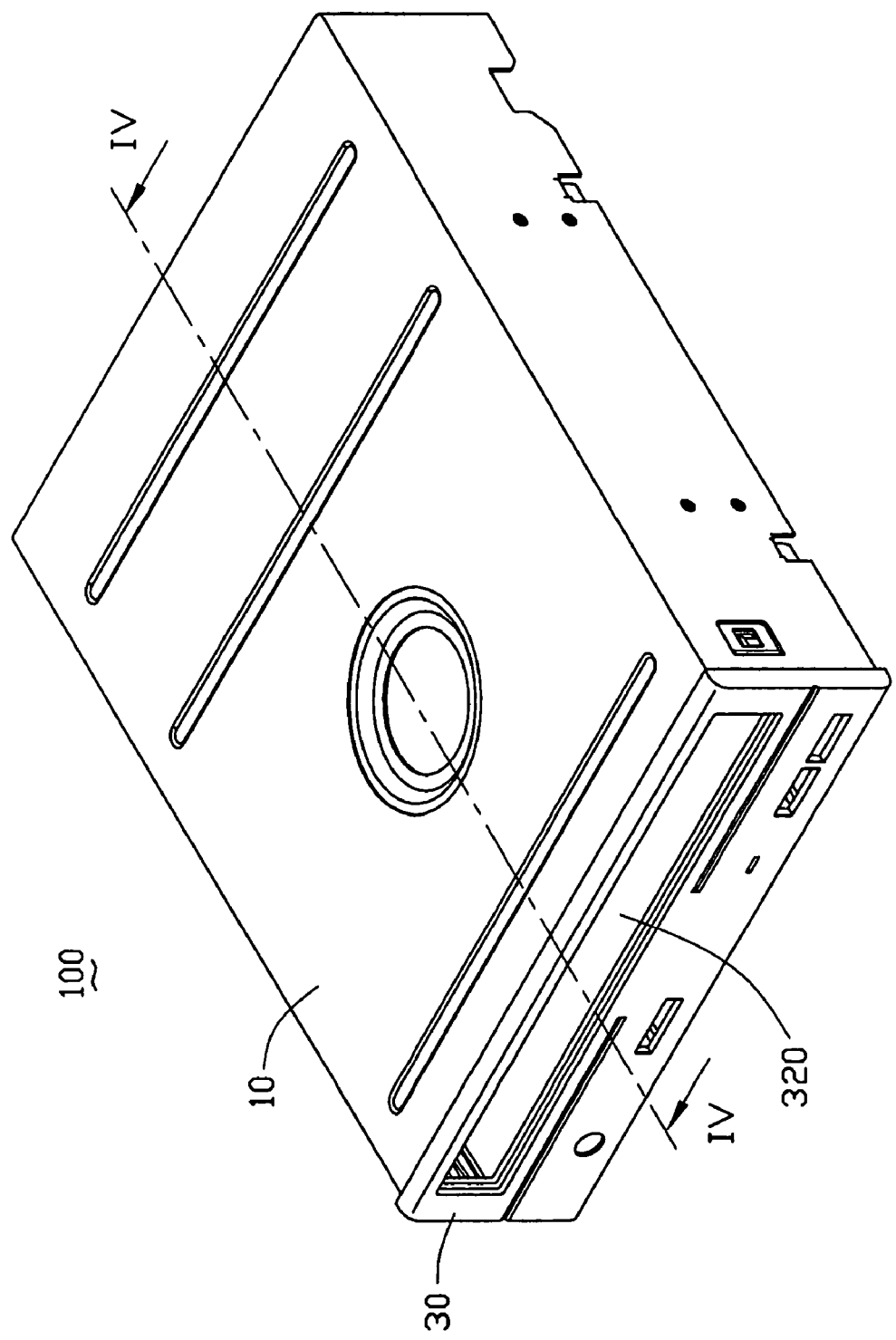
FIG. 1 is an isometric view of a protection device for an optical recording/reproducing apparatus in accordance with a first embodiment of the present invention.

Reference will now be made to the drawing figures to describe the preferred embodiments of the present invention in detail.

FIG. 1 shows a protection device 100 for an optical recording/reproducing apparatus in accordance with the first embodiment of the present invention. The protection device 100 comprises an upper cover 10, a front panel 30, and a lower cover (not shown). The upper cover 10 and the lower cover are engaged with each other. The front panel 30 is fastened to the upper cover 10 and the lower cover.

Figure 2:
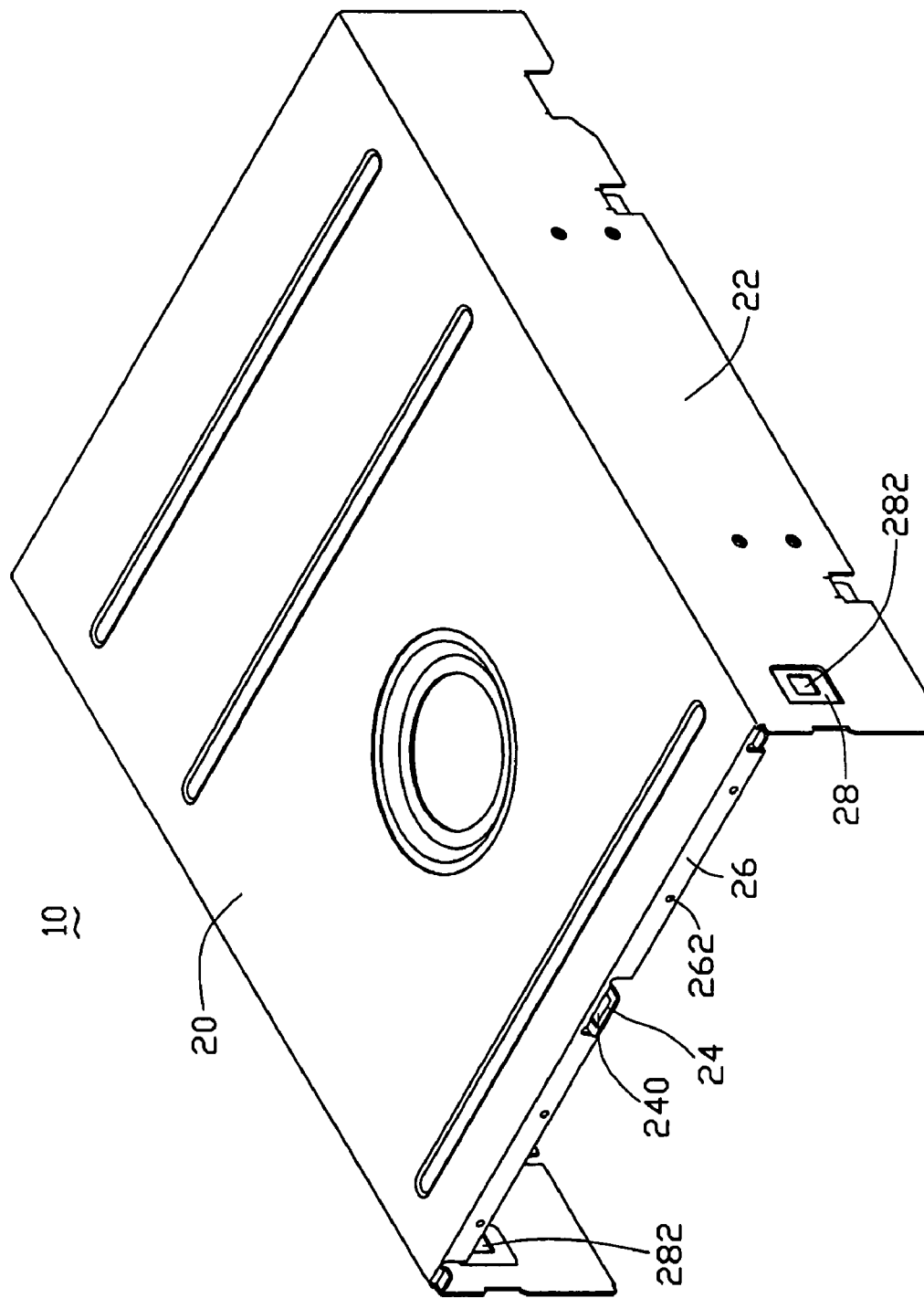
FIG. 2 is an isometric view of an upper cover of the protection device of FIG. 1.

Referring to FIG. 2, the upper cover 10 comprises a horizontal top plate 20, and two side walls 22 extending vertically down from opposite sides of the top plate 20 respectively. Two blocking strips 26 as a first portion of the upper cover 10 extend down from a front edge of the top plate 20. Two mounting holes 262 are defined in each blocking strip 26. A first clasping portion 24 with a first clasping hole 240 in a center thereof to be a second portion of the upper cover 10 extends forwardly from the front edge of the top plate 20, between the blocking strips 26. A rectangular recess 28 with a second clasping hole 282 in a center thereof is formed in a front end of each side wall 22.

Figure 3:
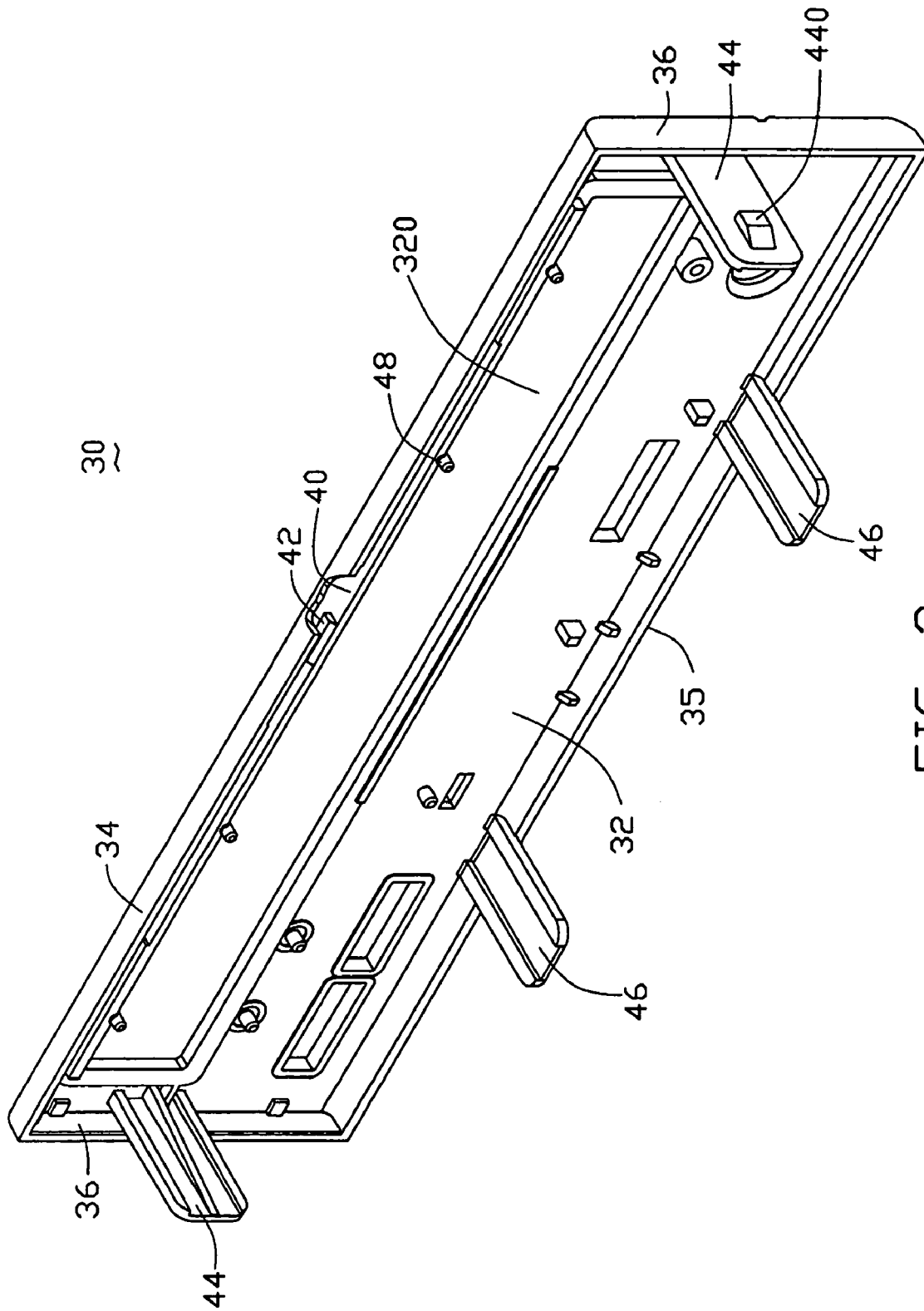
FIG. 3 is an enlarged, isometric view of a front panel of the protection device of FIG. 1, viewed from a rear aspect.

Now referring to FIG. 3, the front panel 30 comprises a main body 32, a first flange 34, two second flanges 36, and a third flange 35. The first flange 34, the two second flanges 36, and the third flange 35 are bent backward from a top edge, two side edges, and a bottom edge of the main body 32 respectively. A sealing strip 40 with a first latch 42 is formed under and very close to the first flange 34. The first clasping portion 24 is inserted into a slot defined between the first flange 34 and the sealing strip 40, such that the first clasping hole 240 can claspingly receive the first latch 42. That is, the first latch 42 enters the first clasping hole 240 via a bottom thereof. Four mounting pins 48 protrude backwardly from the sealing strip 40, corresponding to the mounting holes 262 of the blocking strips 26. The mounting pins 48 are engageable in the mounting holes 262 of the blocking strips 26, to position the front panel 30 on the upper cover 10. A pair of side arms 44 extends backward from two sides of the main body 32 respectively, adjacent the second flanges 36. Each side arm 44 has a second latch 440 near a distal end thereof, for claspingly engaging in the second clasping hole 282 of the corresponding side wall 22. Similarly, two bottom arms 46 extend backward from the main body 32, adjacent the third flange 35. Each bottom arm 46 has a latch (not shown), for claspingly engaging in clasping holes of the lower cover.

Figure 4:
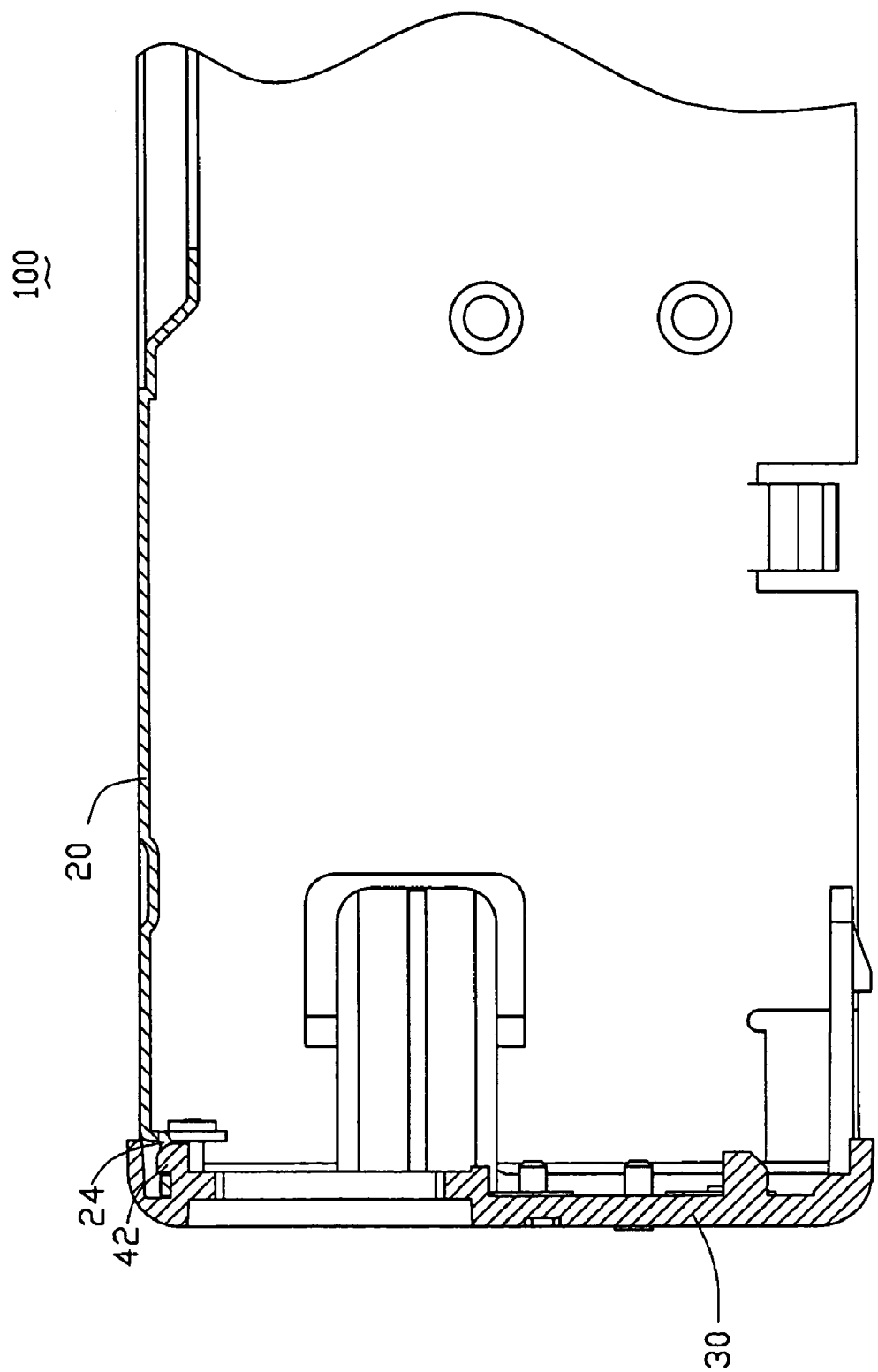
FIG. 4 is a cross-sectional view of part of the protection device of FIG. 1, taken along IV-IV thereof.

Now referring to FIG. 4, in assembly, the upper cover 10 is engaged with the lower cover. Then, the front panel 30 is secured to the upper cover 10 and the lower cover. The mounting pins 48 of the front panel 30 are pinned in the mounting holes 262 of the blocking strips 26, the first and second clasping holes 240, 282 of the upper cover 10 respectively claspingly receive the first and second latches 42, 440 of the front panel 30, and the clasping holes of the lower cover claspingly receive the latches of the bottom arms 46. Because the second clasping holes 282 are defined in the recesses 28, when the second latches 440 are engaged in the second clasping holes 282, the second latches 440 do not protrude beyond outside faces of the side walls 22 of the top plate 20.

Figure 5:
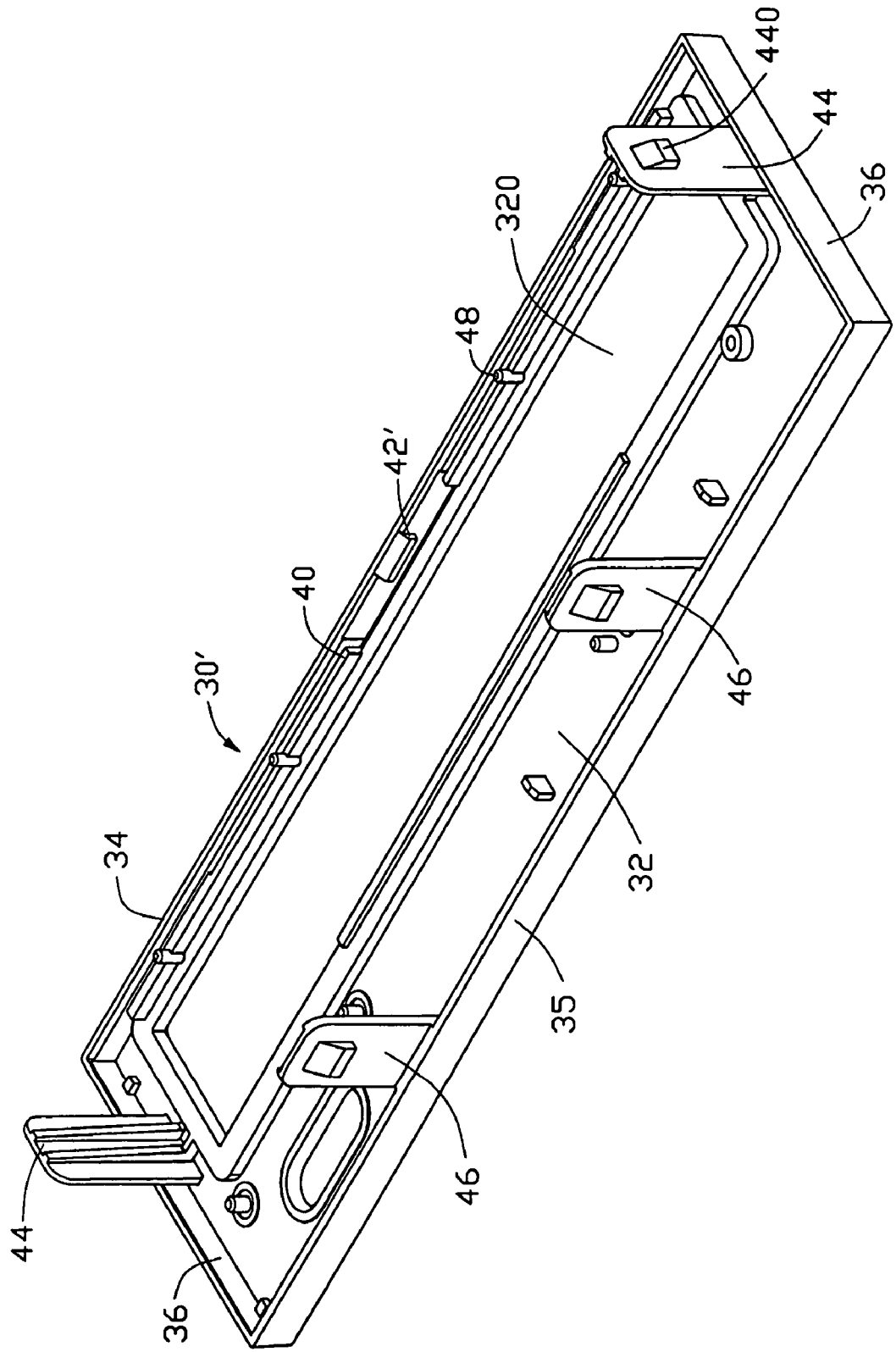
FIG. 5 is an isometric view of a front panel of a protection device for an optical recording/reproducing apparatus in accordance with a second embodiment of the present invention, viewed showing the front panel face down.

FIG. 5 shows a front panel 30' of a protection device in accordance with the second embodiment of the present invention. Unlike in the first embodiment, a first latch 42' is formed on an inner surface of the first flange 34. The first clasping portion 24 is clasped by the first latch 42' being claspingly received in the first clasping hole 240. That is, the first latch 42' enters the first clasping hole 240 via a top thereof.

If an optical disk in an optical recording/reproducing apparatus breaks into pieces suddenly, the pieces are effectively blocked by the blocking strips 26. Further, the four sides of the front panel 30 are firmly fixed to the upper cover 10 and the lower cover. Any small debris flying out through the gap between the two blocking strips 26 can be blocked by an upper portion of the front panel 30, whereby the firm attachment of the front panel 30 to the upper cover 10 cannot easily be disturbed. Damage or danger caused by flying off of debris is effectively avoided.

Although the present invention has been described with reference to specific embodiments, it should be noted that the described embodiments are not necessarily exclusive, and that various changes and modifications may be made to the described embodiments without departing from the scope of the invention as defined by the appended claims.

What is claimed is:

1. A protection device for an optical recording/reproducing apparatus, comprising:
at least one cover comprising a clasping portion extending from a front edge thereof, the clasping portion defining a first clasping hole, and the cover defining a front opening;
a front panel fixed to the cover at the front opening, the front panel comprising a first latch and at least one mounting pin, the first latch being engageable in the first clasping hole; and
at least one blocking strip extending down from the front edge of the cover and substantially blocking out a top portion of the front opening of the cover, for preventing debris of an optical disk from flying out and causing damage to the optical recording/reproducing apparatus, the blocking strip defines at least one mounting hole engagingly receiving the at least one mounting pin of the front panel.

2. The protection device as recited in claim 1, wherein a lower edge of the at least one blocking strip substantially aligns with a tray opening defined on the front panel.

3. The protection device as recited in claim 2, wherein the front panel further comprises two opposite lateral second latches, and opposite sides of the cover define a pair of second clasping holes engageably receiving the second latches.

4. The protection device as recited in claim 3, wherein the front panel further comprises a third latch at a bottom thereof.

5. The protection device as recited in claim 4, wherein a bottom of the cover defines a third clasping hole engageably receiving the third latch.

6. The protection device as recited in claim 5, wherein a pair of recesses is formed in the sides of the cover, with the second clasping holes being defined in the recesses, for preventing the second latches from protruding beyond outside faces of the sides of the cover.

7. The protection device as recited in claim 1, wherein the front panel further comprises a flange bent backward from a top edge of the front panel, and a sealing strip formed under and close to the flange; thus a slot is defined between the flange and the sealing strip; the first latch is disposed on the sealing strip and between the flange and the sealing strip; when the front panel is fastened to the at least one cover, the clasping portion is inserted into the slot, and the first latch is engaged in the first clasping hole.

8. The protection device as recited in claim 1, wherein the front panel further comprises a flange bent backward from a top edge of the front panel, the first latch is formed on an inner surface of the flange.

9. A protection device for an optical recording/reproducing apparatus, comprising:
a front panel comprising a first latch;
at least one cover comprising a clasping portion having a first clasping hole extending forwardly from a front top edge thereof, the first clasping hole engageably receiving the first latch, the cover further comprising at least one blocking strip extending downwardly from a front top edge thereof, for preventing debris of an optical disk from flying out and causing damage to the optical recording/reproducing apparatus, the at least one blocking strip defines at least one mounting hole.

10. The protection device as recited in claim 9, wherein the front panel further comprises at least one mounting pin engaged in the at least one mounting hole of the at least one blocking strip.

11. The protection device as recited in claim 10, wherein a pair of arms extends backward from opposite lateral sides of the front panel, and each of the arms has a second latch.

12. The protection device as recited in claim 11, wherein opposite lateral sides of the cover define a pair of second clasping holes engageably receiving the second latches.

13. The protection device as recited in claim 12, wherein a third arm extends backward from a bottom of the front panel, and the third arm has a third latch.

14. The protection device as recited in claim 13, wherein a bottom of the cover defines a third clasping hole engageably receiving the third latch.

15. An optical recording/reproducing apparatus, comprising:
at least two covers jointly to enclose said apparatus;
a front panel attached to a side of said at least two covers and providing an opening thereon to expose interior of said apparatus; wherein
one of said at least two covers extends next to said opening of said front panel and is fixedly engagable with said front panel beside said opening at a first portion and a second portion thereof, said first portion is engagable with said front panel in a way different from said second portion, and said second portion is a plurality mounting holes formed on a blocking strip extending from said one of said at least two covers so as to be pinned with corresponding pins of said panel.

16. The optical recording/reproducing apparatus as recited in claim 15, wherein said first and second portions of said one of said at least two covers are juxtaposed next to said opening and arranged along a side of said opening.

17. The optical recording/reproducing apparatus as recited in claim 15, wherein said first portion of said one of said at least two covers is a clasping portion with a hole so as to engagably receive a latch of said front panel therein.

* * * * *